United States Patent [19]

Sakashita et al.

[11] Patent Number: 5,673,098
[45] Date of Patent: Sep. 30, 1997

[54] FEED DEVICE FOR MOTION PICTURE FILM AND DEVICE FOR DETECTING ABNORMALITIES IN PERFORATIONS

[75] Inventors: Akio Sakashita, Kanagawa; Noriaki Sakata, Tokyo, both of Japan

[73] Assignee: Sony Corporation, Tokyo, Japan

[21] Appl. No.: 569,393

[22] Filed: Dec. 8, 1995

[30] Foreign Application Priority Data

Dec. 28, 1994 [JP] Japan .................................. 6-328367

[51] Int. Cl.⁶ .................................................. G03B 29/00
[52] U.S. Cl. .................... 352/131; 352/166; 352/244; 356/443; 250/559.02
[58] Field of Search .................... 348/88, 130, 133; 250/548, 559.02; 352/131, 166, 244; 356/430, 443, 444

[56] References Cited

U.S. PATENT DOCUMENTS

| | | | |
|---|---|---|---|
| 2,641,956 | 6/1953 | Morrison et al. | 73/157 |
| 3,856,414 | 12/1974 | Menary | 356/430 |
| 4,652,124 | 3/1987 | Bowen et al. | 356/237 |
| 4,652,125 | 3/1987 | Bowen et al. | 356/237 |
| 4,683,380 | 7/1987 | Shipkowski et al. | 250/548 |
| 5,107,127 | 4/1992 | Stevens | 250/548 |

*Primary Examiner*—Russell E. Adams
*Attorney, Agent, or Firm*—Jay H. Maioli

[57] ABSTRACT

A controller uses image processing to detect any abnormalities in the shape and distance of the perforations of a motion picture film by means of image data obtained upon imaging the perforations of the running motion picture film by a video camera in a sensor unit arranged in the film running path. If any abnormalities are detected in the perforations in the motion picture film running in the film running path, an error output specifying such abnormalities is fed to a system controller that operates to stop the film drive system including stopping the intermittent film feed at the optical film gate and extinguishing the light source illuminating the film.

17 Claims, 9 Drawing Sheets

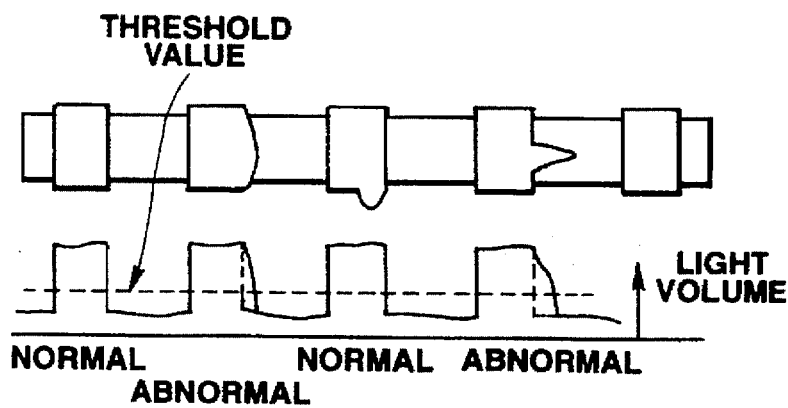
FIG.7A
FIG.7B
FIG.8A
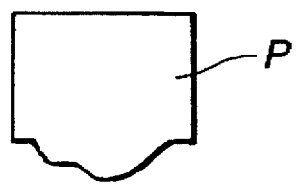
FIG.8B
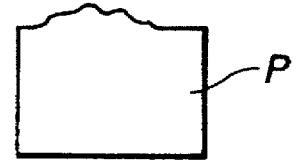
FIG.8C

FEED DEVICE FOR MOTION PICTURE FILM AND DEVICE FOR DETECTING ABNORMALITIES IN PERFORATIONS

BACKGROUND OF THE INVENTION

1. Field of the Invention

This invention relates generally to a feed device for a motion picture film and, more particularly, to a device for detecting unusual perforations in the motion picture film and controlling the film running system in response thereto.

2. Description of Background

In a projector or a tele-cine device, it has been customary to run a motion picture film reeled out from a film supply reel loaded on a film reel loader of a film supply unit along a film path in the projector unit so as to be taken up on a take-up reel loader of a film reel loader of a film take-up unit. In general, a motion picture film needs to be driven along the film running path under constant conditions for accurately reproducing the speech or pictures recorded on the film.

In the conventional motion picture running system, the motion picture film is run continuously using a sprocket gear or intermittently using a feed pin having feed pawls engaged with small holes, known as perforations, formed along both lateral edges of the film. More specifically, the motion picture film is continuously pulled out from a film supply reel by rotation of a sprocket gear so as to be sent to the frame projector unit of the motion picture projector. The frame projector unit intermittently feeds the motion picture film, frame by frame, by a driving system having a pin, called a claw pin, performing an elliptical movement, and the frame position is set by another system having a pin, called a registration pin, which is movable perpendicularly relative to the film surface. The motion picture film which has passed through the frame projector unit is then taken up by the film take-up reel.

In such a feed device for motion picture film wherein the motion picture film is driven using the perforations formed in the film, if abnormalities in the perforations are encountered, not only is the regular running of the motion picture film impeded, but also the perforations tend to be further destroyed, thus occasionally making the motion picture film unusable.

More specifically, if any abnormalities in the perforations are encountered, intermittent feed at the frame projection unit cannot be performed regularly by the claw pin, so that the inserting positions of the registration pin tend to be incorrect, thereby further damaging the film.

The abnormalities in the perforations in the motion picture film may be caused by destruction and consequent deformation of the perforations and by changes in the distance between the perforations caused by splicing during manual film editing.

OBJECTS AND SUMMARY OF THE INVENTION

In view of the above-described problem of the prior art, it is an object of the present invention to provide a feed device for a motion picture film having the function of preventing the occurrence of motion picture film running troubles caused by abnormalities in the film perforations.

It is another object of the present invention to provide a device for detecting abnormalities in the perforations in a motion picture film, whereby abnormalities in the perforations in the motion picture film running along a film running path may be detected positively.

According to an aspect of the present invention a feed device for a motion picture film is provided including a film running system having a film running path for continuously reeling out the motion picture film from a film supply reel and winding the film on a film take-up reel, and intermittent feed means provided on the film running path for intermittently feeding the motion picture film via perforations formed in the motion picture film. The feed device includes means for detecting abnormalities in perforations between the film supply reel and the intermittent feed means.

According to another aspect of the present invention a film feed device includes a stop control means for stopping film feed in response to detection of abnormalities by the detection means configured for detecting abnormalities in the perforations.

The feed device for a motion picture film according to the present invention is characterized in that detection means configured for detecting the abnormalities in the perforations images the perforations in the running motion picture film for detecting abnormalities in the perforations by image processing. The feed device for a motion picture film according to the present invention is characterized in that the detection means for detecting abnormalities in perforations detects abnormalities in the shape of perforations and/or the distance between perforations by image processing.

Another aspect of the present invention also provides a device for detecting abnormalities in perforations in a motion picture film including imaging means for imaging perforations in a motion picture film running in a film running path, and image processing means for detecting abnormalities in perforations based upon an imaging output of the imaging means by image processing. The device for detecting abnormalities in perforations in a motion picture film according to the present invention is characterized in that image processing means detects abnormalities in the shape of perforations and/or the distance between perforations by image processing.

In the present feed device for a motion picture film including a film running system having a film running path for continuously reeling out the motion picture film from a film supply reel and winding the film on a film take-up reel, and having intermittent feed means provided on the film running path for intermittently feeding the motion picture film via perforations formed in the motion picture film, abnormalities in perforations are detected by means configured for detecting abnormalities in perforations provided between the film supply reel and the intermittent feed means.

Furthermore, with the motion picture film feed device according to the present invention, the film feed and the projector operation are stopped by stop control means responsive to detection of abnormalities by the means configured for detecting any abnormalities in perforations.

With the feed device for a motion picture film according to the present invention, the perforations in the running motion picture film are imaged by means for detecting abnormalities in perforations and abnormalities in the shape and/or the distance of the perforations are detected by image processing as abnormalities in perforations.

With the device for detecting abnormalities in perforations in the motion picture film according to the present invention, the perforations in the motion picture film running in the film running path are imaged by imaging means, and image processing for detecting abnormalities in perforations based upon an imaging output of the imaging means is carried out by image processing means.

With the device for detecting abnormalities in perforations in the motion picture film according to the present invention, image processing is carried out by an image processing circuit for detecting the shape and/or the distances between the perforations for determining abnormalities in the perforations.

BRIEF DESCRIPTION OF THE DRAWINGS

FIGS. 7A and 7B illustrate the relation between the shape of the perforations in the motion picture film imaged by the video camera and the sum of light volumes of respective pixels of the CCD image sensor across the film width;

FIGS. 8A, 8B, and 8C are examples of normal and abnormal shapes of the perforations judged by image processing according to an embodiment of the present invention;

DETAILED DESCRIPTION OF PREFERRED EMBODIMENTS

Figure 1:
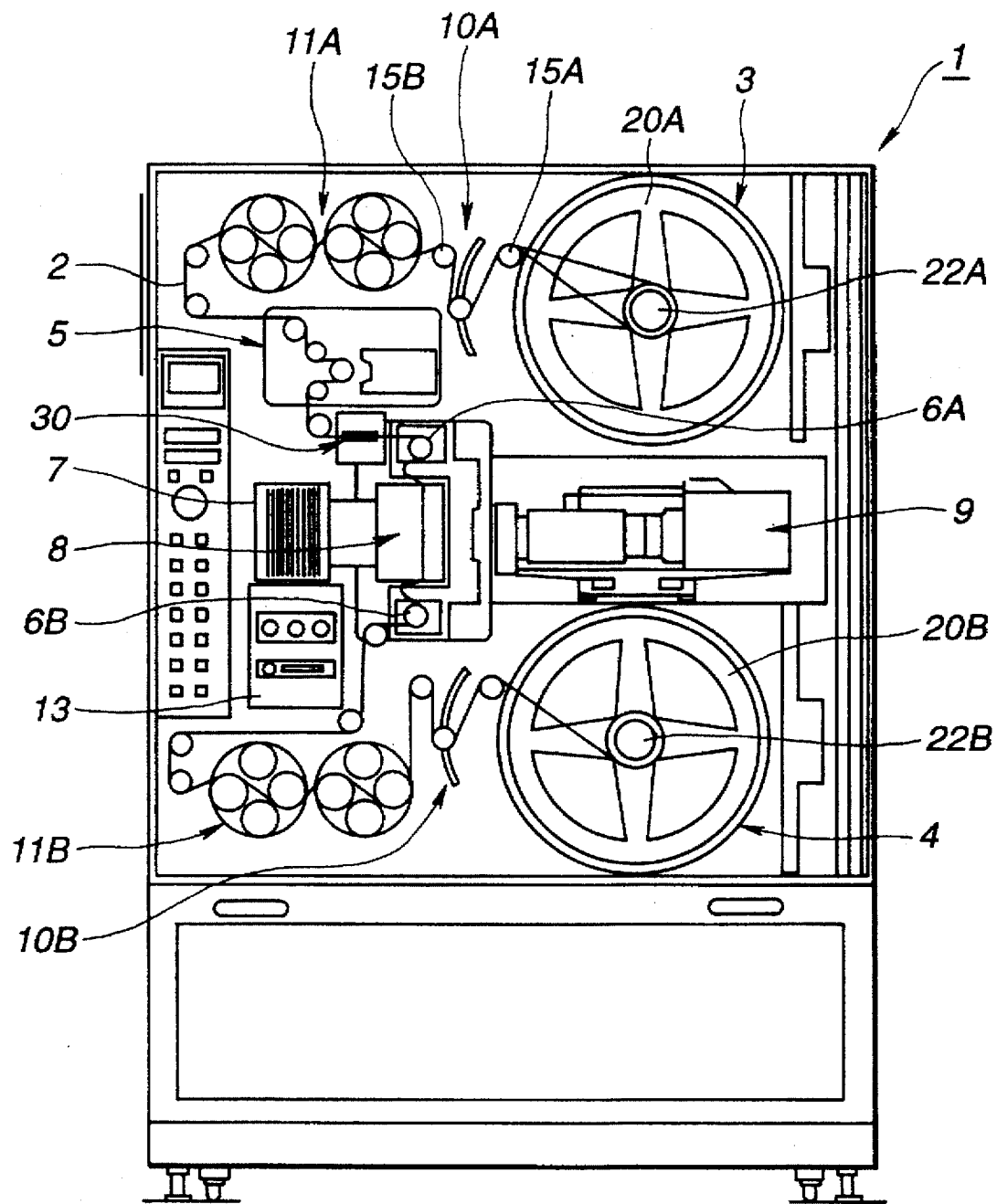
FIG. 1 is a front view showing a main portion of a tele-cine device employing a feed device for a motion picture film and a device for detecting abnormalities in the perforations according to an embodiment of the present invention.

Referring to the drawings, the feed device for the motion picture film and the device for detecting abnormalities in the film perforations embodying the present invention will be explained in detail.

The feed device for a motion picture film according to the present invention has a device for detecting abnormalities in the film perforations in a continuous running portion in the motion picture film running path. The feed device for the motion picture film and the device for detecting abnormalities in the film perforations is applied to a tele-cine device 1, which is shown in FIG. 1.

The tele-cine device 1 includes a film supply reel loader 3 for loading a film supply reel 20A thereon and a film take-up reel loader 4 for loading a film take-up reel 20B thereon. The reels 20A and 20B are spaced apart vertically from each other so that a motion picture film 2 reeled out from the film supply reel 20A is run along the film running path so as to be taken up on the film take-up reel 20B.

Along the film running path are arrayed a supply side tension detection unit 10A, a supply side dust and dirt removing unit 11A, an optical sound unit 5, a sensor 30 constituting a detector for detecting abnormalities in perforations formed in the film, a film driver 8 arranged between a light source 7 and an imager 9, a take-up side dust and dirt removing unit 11B and a take-up side tension detection unit 10B.

The supply side tension detection unit 10A detects whether the motion picture film 2 is being reeled out from the film supply reel 20A under a pre-set running tension and controls a reel driving motor 22A of the film supply reel loader 3 by an output control signal.

The supply side dust and dirt removing unit 11A is made up of several rolls each having a viscous outer surface, and the film 2 is arranged therethrough so that each side of the film contacts a viscous surface. The motion picture film 2 is adapted to run in a meandering path between these rolls. The motion picture film 2 reeled out from the film supply reel 20A is passed through the supply side dust and dirt removing unit 11A so that dust and dirt affixed on the surfaces of the motion picture film 2 can be removed.

The optical sound unit 5 optically reads and reproduces analog sound signals optically recorded with a shift of a pre-set number of frames with respect to associated picture frames in analog sound tracks provided between picture frames of the motion picture film 2 and rows of film-driving perforations formed on both lateral sides of the motion picture film 2.

It is crucial that the sound signals be coincident with the associated picture frames. The sound signals are reproduced in advance in the optical sound unit 5 installed ahead of the imager 9 and the time deviation corresponding to the difference between the pre-set number of frames between the imager 9 and the optical sound unit 5 and a pre-set number of frames is corrected by a delay in outputting the sound signal.

The film driver 8 functions as an intermittent feed means for intermittently feeding the motion picture film 2, frame by frame, using a so-called claw pin configured for adjusting for the differences in the design of motion picture film and video tape. That is, the film driver 8 is actuated to intermittently drive the motion picture film 2 in the forward direction at a rate of, for example, 30 frames per second or less. Ahead and behind the film driver 8 are arranged driving sprockets 6A, 6B for running the motion picture film 2 into and out of the film drive 8 under a pre-set constant state.

Fast forward and rewind of the motion picture film 2 are carried out by continuously running the motion picture film 2 using the take up motor 22B and supply motor 22A, without actuating the film drive 8 for further alleviating any film damage.

The imager 9 images the pictures of the motion picture film 2 into video signals. That is, picture frames of the motion picture film 2 running through the film drive 8 are radiated with light from the light source 7 and thereby imaged by the imager 9. The imager 9 is made up of a lens system and a video camera (not shown). The operation of the optical sound unit 5, light source 7, film drive 8, and the imager 9 is controlled by an actuator 13.

The motion picture film 2 that has run through the film drive 8 is taken up via a take-up side dust and dirt removing unit 11B and the take-up side tension detector 10B by the film take-up reel 20B mounted on the take-up reel loader 4. The take-up side dust and dirt removing unit 11B is Configured substantially the same as the above-described supply side dust and dirt removing unit 11A and assures that the motion picture film 2 is taken up in a clean state onto the film take-up reel 20B. The take-up side tension detector 10B detects the running tension of the motion picture film 2 and controls the reel driving motor 22B mounted on the take-up reel loader 4, so that the motion picture film 2 will be taken up in a stable state on the film take-up reel 20B.

Figure 2:
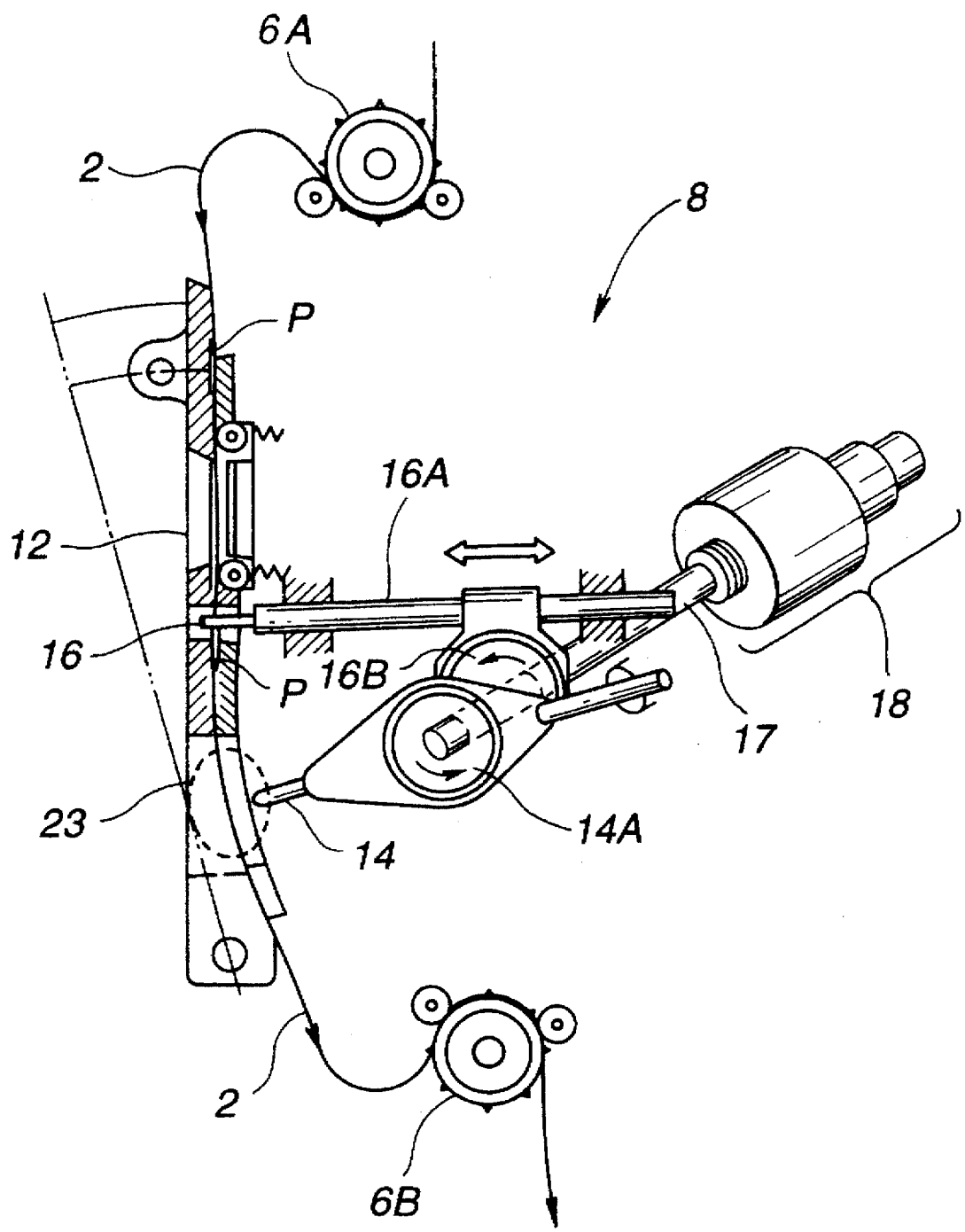
FIG. 2 is a schematic representation of the film feed device found in the device of FIG. 1 according to an embodiment of the present invention.

The film drive unit 8 is shown in more detail in FIG. 2, wherein the apparatus suitable for driving the film so as to pause momentarily on a frame by frame basis at the light aperture 12 is shown. More specifically, the film 2 is driven as a constant rate by the supply side feed sprocket 6A and the take up side sprocket 6B but with sufficient slack so that the film 2 can be intermittently positioned at the film aperture 12. This is accomplished by means of a pull-down claw 14 that is driven by a pull-down eccentric cam 14A. The film 2 is caused to be in registry with the aperture 12 by means of a registration pin 16 that engages the Perforation of the film 2. The registration pin 16 is attached to the registration drive shaft 16A that is driven by a registration eccentric cam 16B. The pull down eccentric cam 14A and registration eccentric cam 16B are driven by a drive shaft 17 that is rotated by means of a servo motor system 18 that includes a motor, as well as a tachometer, and a pulse generator, which are utilized in the overall control of the servo motor system 18. The film is positioned in the conventional film gate system utilizing a pivotal arrangement shown generally at 18 that permits loading the film initially. The pull-down claw or pin 14, which is operated by action of the pull-down eccentric cam 14A and the cam drive shaft 17, describes an elliptical operating path shown by the dashed ellipse 23. This operation of the registration pin 16 and pull down pin 14 is shown more clearly in FIGS. 3A–3E.

Figure 3:
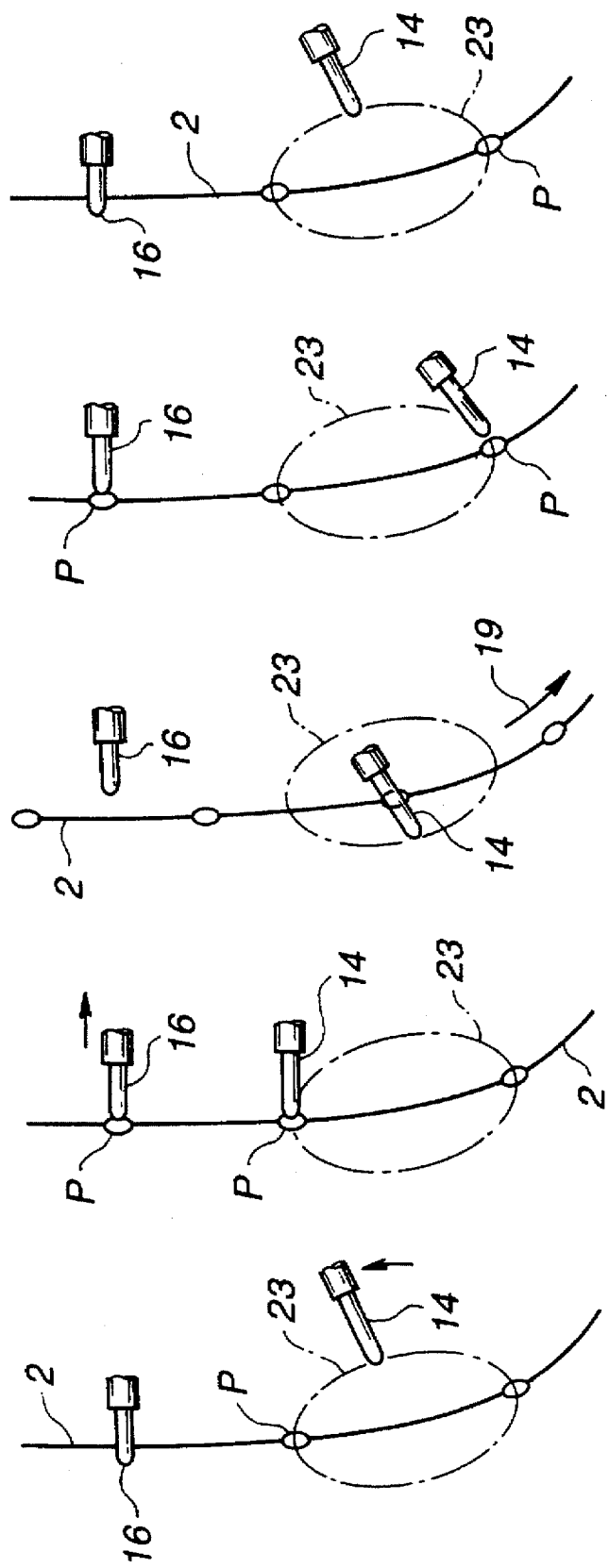
FIGS. 3A–3E represent the operation of the device of FIG. 2 according to an embodiment of the present invention.

In FIG. 3A the registration pin 16 is inserted into a perforation P in film 2 while the pull down claw 14 is at a point along its path 23 prior to performing a pull-down operation. Thus, in the film state shown in FIG. 3A, each frame of the motion picture film is halted in registry with the aperture 12 as shown in FIG. 2.

In FIG. 3B the registration pin 16 is being retracted from the perforation P while the pull-down claw 14 is being inserted into the perforation P immediately downstream from the perforation P at which the registration pin is being retracted.

In FIG. 3C the registration pin 16 is out of contact with the film 2 whereas the pull-down claw 14 is now fully inserted into the perforation P and as it traverses its orbit 23 the pull-down claw 14 will operate to pull the film in a downward motion, as represented by arrow 19.

FIG. 3D shows the lowermost portion of the travel of the pull-down claw 14 in its elliptical orbit 23, at which point it is then being retracted from the perforation P in which it was previously inserted and the registration pin 16 is now being inserted into the next successive perforation P in the film 2.

FIG. 3E is identical to FIG. 3A showing the cyclical nature of this film frame registration operation.

Figure 4:
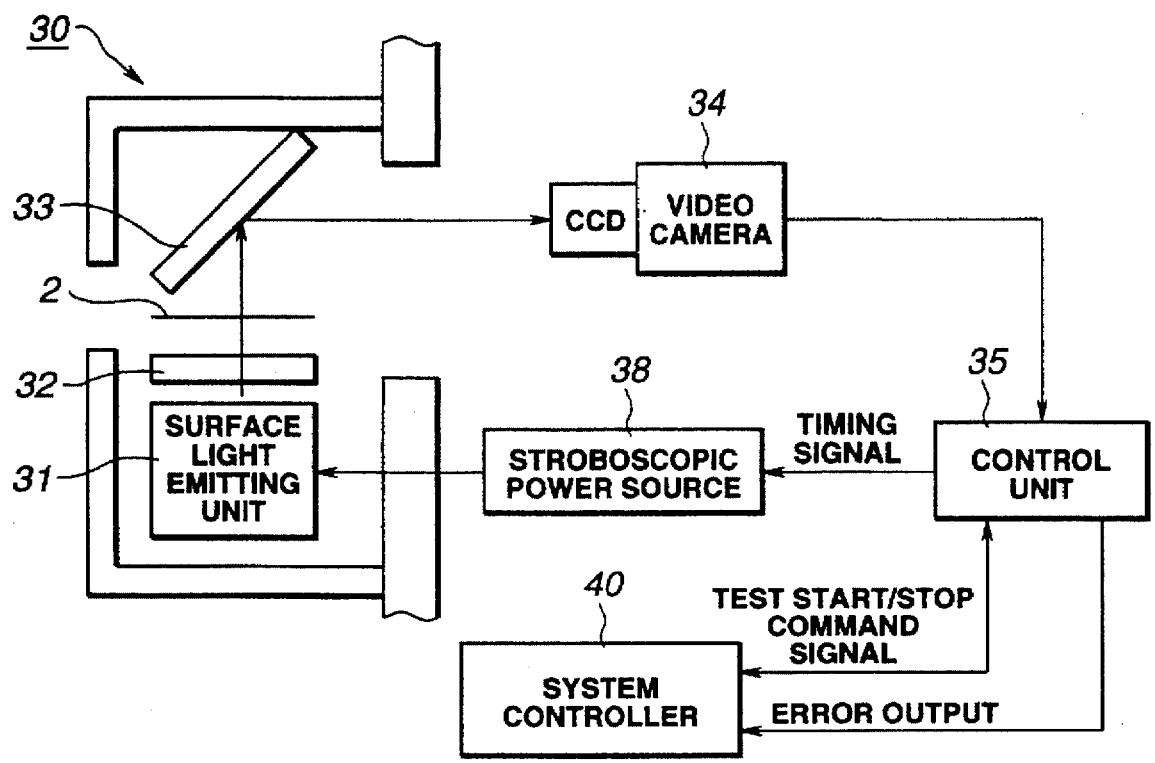
FIG. 4 is a block diagram of a device for detecting abnormalities in the film perforations applied to the tele-cine device shown in FIG. 1.

The sensor 30 arranged between the optical sound unit 5 and the film drive 8 provides a device for detecting abnormalities in the perforations. As shown in FIG. 4, the sensor 30 is configured so that an illuminating light beam is radiated by a surface light emitting unit 31 through a diffusion plate 32 and onto the motion picture film 2 that is continuously supplied through the optical sound unit 5 to the film drive 8. The diffused light transmitted through the motion picture film 2 is reflected via a reflecting plate 33 to a video camera 34.

The video camera 34 functions as a picture input means for detecting abnormalities in perforations by image processing and is comprised of a CCD image sensor (not shown). Thus the video camera 34 images the motion picture film 2 with a field of view of 52×39 mm for positively capturing the perforations P of the motion picture film 2. An imaging output of the video camera 34 is supplied to a control unit 35.

The surface light emitting unit 31 is configured for stroboscopically emitting the light by a stroboscopic power source 36 supplied with a timing signal from the control unit 35.

Since the sensor 30 is arranged after the optical sound unit 5 but before the drive unit 8 where the motion picture film 2 is run intermittently, it is possible for the surface light emitting unit 31 to emit a light pulse a number of times for the same picture frame to facilitate capturing the picture frame by the video camera 34.

Figure 5:
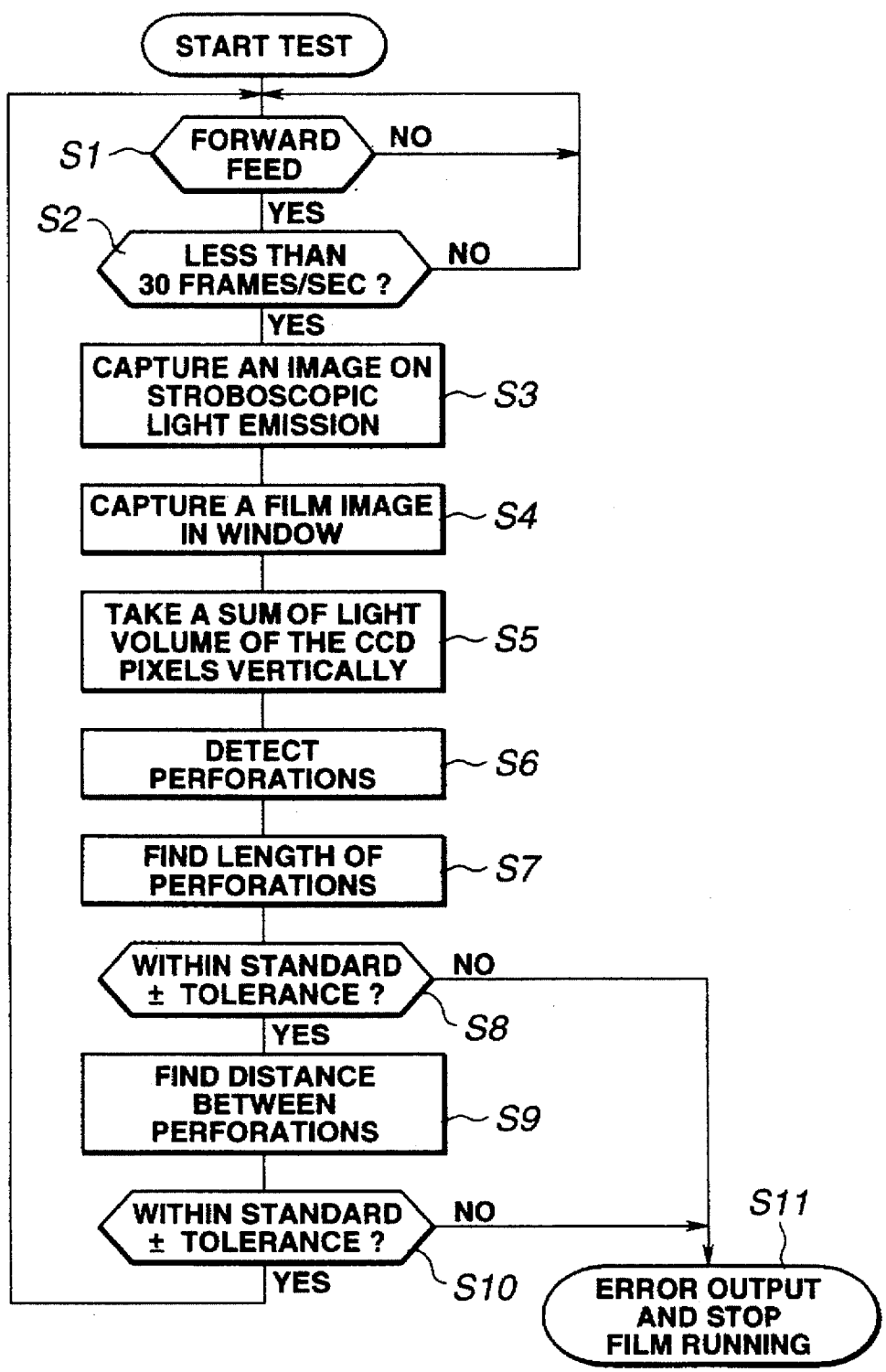
FIG. 5 is a flow chart showing the operation of a controller used in the device for detecting abnormalities in film perforations shown in FIG. 4.

The control unit 35 is responsive to a command signal from a system controller 40 to control the operation of the inspection mode as shown in the flow chart of FIG. 5. The system controller accepts an actuating input(not shown) from the actuator 13 shown in FIG. 1 for controlling the operation of the tele-cine device 1. That is, the controller 35 enters into and exits from an inspection mode when an inspection switch provided in the actuator 13 is in the on-state and in the off-state, respectively.

Referring then to FIG. 5, when entering into the inspection mode, the controller 35 judges at step S1 whether the motion picture film 2 is in the forward running state. If the result of judgment at step S1 is NO, that is if the motion picture film is not in the forward running state, the judgment operation of step S1 is repeated to await the establishment of the forward running state. If the result of judgment is YES, that is, if the film is already in the forward running state, the control unit 35 transfers to the next step S2.

The control unit 35 judges at step S2 whether the running speed of the motion picture film 2 in the film running system is lower than 30 frames/second. If the result of judgment at step S2 is NO, that is, if the running speed is higher than 30 frames/second, the controller 35 reverts to step S1 to repeat the judgment of steps S1 and S2 in order to await the establishment of the state of the running speed lower than 30 frames/second. This feature is provided to accommodate the situation where the film is being run in a rewind or fast-forward mode where the film drive unit 8 is not operated, and the perforation detection operation need not be performed. If the result of the judgement is YES, that is, if the film is in the forward running state at a speed less than 30 frames/second, the control unit 35 transfers to the next step S3. In other words, the control unit 35 transfers to step S3 when the film drive 8 is actuated for intermittently feeding the motion picture film 2 in the forward direction at a rate of not higher than 30 frames/second.

At step S3, the control unit 35 supplies a timing signal having a 33 ms period to the stroboscopic power source 36 for stroboscopically emitting the light by the surface light emitting unit 31. The motion picture film 2 is thereby stroboscopically imaged by the video camera 34.

Figure 6:
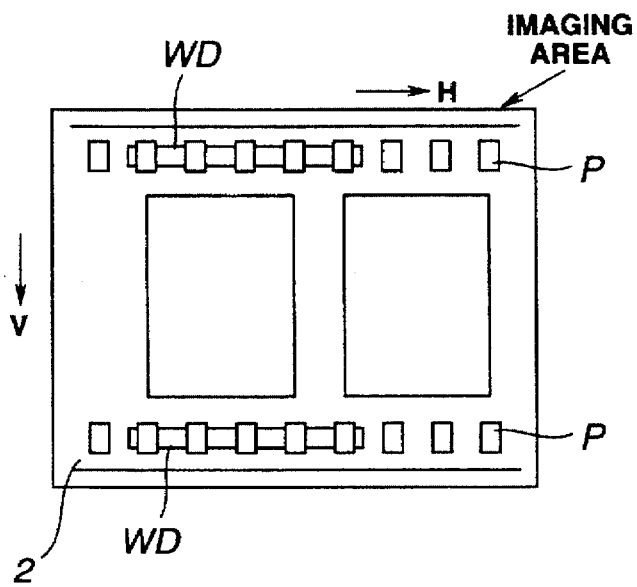
FIG. 6 schematically shows an image obtained by a video camera in the device for detecting abnormalities in film perforations shown in FIG. 4.

At the next step S4, the control unit 35 captures picture data of respective perforations P of an imaged picture with a field of view of 52×39 mm, as shown in FIG. 6 obtained by stroboscopically imaging the frame of the motion picture film 2 by the video camera 34, as detection data in each inspecting window WD shown in FIG. 6.

FIG. 6 shows at WD the detection area that is seen by the CCD imager (not shown) in the video camera 34. Although the area WD is not shown extending continuously along the length of the film, it will be understood that what is being illustrated is the view of the CCD imager as it scans the film base at the location of the perforations P.

At the next step S5, the control unit 35 takes the sum of picture data of the detection data in the inspection window WD captured at step S4, that is, the sum of the imaged picture of the field of view shown in FIG. 6 along the film width in direction V. In other words, the control unit 35 finds the sum of the light volume of the respective pixels in the CCD image sensor in the vertical direction.

At the next step S6, the control unit 35 compares the sum found at step S5 to a threshold value of the light volume and deems a portion of the film 2 where the light volume sum is larger than the threshold value as a perforation P, while deeming a portion of the film 2 in the detection window WD where the light volume sum is smaller than the threshold value as being a film base.

It is noted that the sum in the direction V of the light volume of respective pixels is found by taking the sum of the picture data of the perforations of various shapes in the film width direction in FIG. 7A, that is, along the width V of the film, exceeds the threshold value at the respective locations of the perforations P, as shown in FIG. 7B.

At the next step S7, the control unit 35 counts the number of pixels of the portion of picture data deemed to be the perforation P at step S6 in the horizontal direction, that is, in the film running direction H, of the imaged picture of the field of view shown in FIG. 6, in order to find the length in the film running direction of each perforation P.

At the next step S8, the control unit 35 judges whether the lengths in the direction H of the perforations P as found at the step S7 are all within the range of the prescribed value±tolerance. If the result of judgment is YES, that is, if the lengths of the perforations P as found at the step S7 are all within the range of the prescribed value±tolerance, the control unit 35 judges that the perforations P are of regular shape and transfers to step S9.

On the other hand, if the result of the judgment is NO, that is, if some of the lengths of the perforations P as found at step S7 are not within the range of the prescribed value±tolerance, the control unit 35 judges that the perforations P are partially defective, that is, are of irregular shape, and transfers to step S11. Thus, it is judged at step S8 whether the portions of the picture data deemed to be perforations at step S6 are perforations P having a regular shape as shown in FIG. 8A, or perforations having irregular shapes as shown in FIGS. 8B and 8C.

At step S9 the control unit 35 finds the distance between the points of the center of gravity of neighboring portions of the picture data deemed to be the perforations P detected at step S6. This center of gravity technique is a standard procedure used in image analysis.

At the next step S10, the controller 35 judges whether the distances between the perforations P as found at step S9 are all within prescribed values±tolerance. If the result of judgment at step S10 is YES, that is, if the distances between the perforations P are all within the range of the prescribed value±tolerance, the control unit 35 judges that the perforations P are regular and reverts to step S1. If the result of judgment at step S10 is NO, that is, if the distances between the perforations P are not within the range of the prescribed value±tolerance, the control unit 35 judges that the perforations P are irregular due to splicing performed during manual editing, for example, and transfers to step S11.

Figure 9:
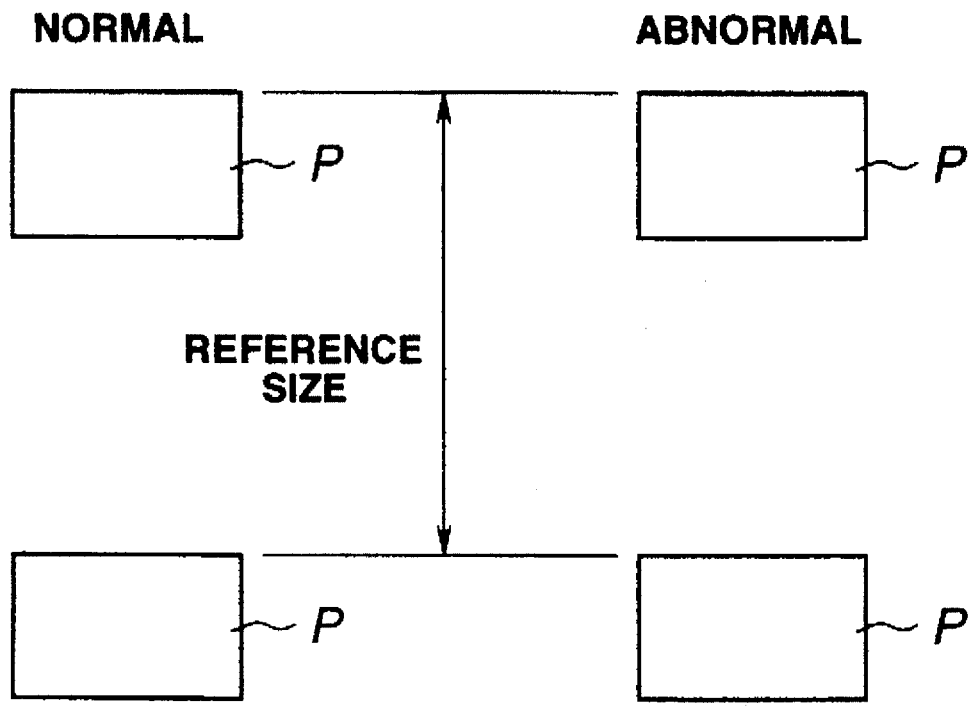
FIG. 9 schematically illustrates examples of distances between the perforations judged by image processing according to an embodiment of the present invention.

It is also possible to find the distance between edges of the shapes deemed as being perforations P at step S6, in order to judge whether the distance is within the prescribed value±tolerance. This is shown in FIG. 9.

At step S11, the control unit 35 issues an error output specifying the abnormalities in the perforations P to the system controller 40 to halt the running and intermittent feed of the film in the film running system, while turning off the imaging light source 7, in order to halt the projector operation and prevent overheating of the film.

With the tele-cine device described above, the picture data of the perforations of the motion picture film 2 running through the sensor 30 in the film running path, as obtained by the video camera 34, are processed by the control unit 35 for detecting abnormalities in perforation shape and distance between successive perforations for accurately detecting abnormalities in the perforations in the motion picture film 2 running in the film running path.

Upon detecting abnormalities in the perforations in the motion picture film 2 running through the film running path, the control unit 35 issues an error output to the system controller 40 specifying the abnormalities in the perforations to stop the running or intermittent feed of the motion picture film in the film running system. Thus, it becomes possible to prevent the occurrence of motion picture film running problems caused by abnormalities in the perforations. Since the projector operation is stopped and the light source extinguished, it is possible to prevent unusual heating and consequent destruction of the motion picture film 2 caused by the imaging light source 7, even if the running or intermittent feed of the motion picture film through the film running system is halted.

Figure 10:
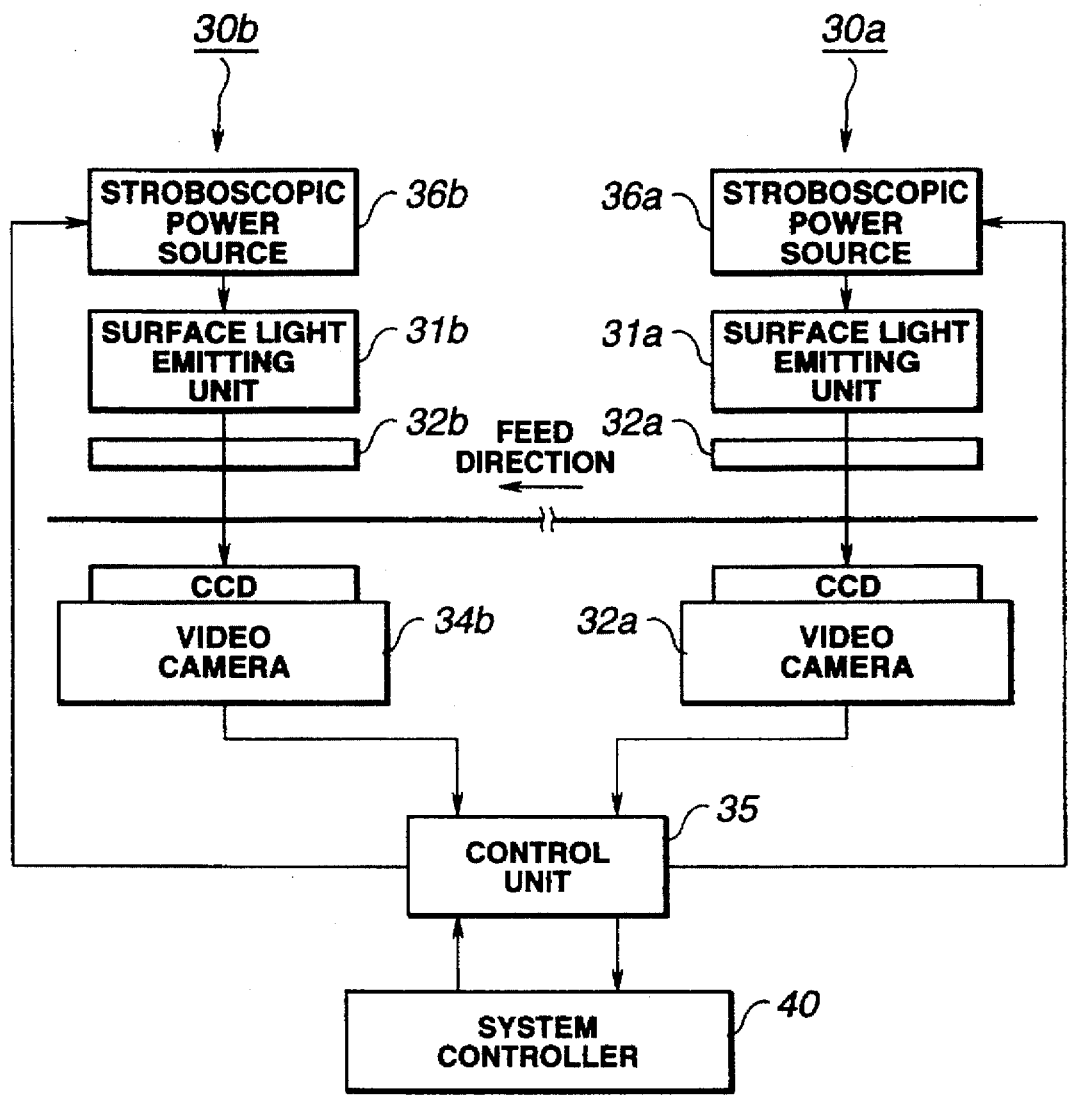
FIG. 10 is a block diagram of a device for detecting abnormalities in film perforations applied to the tele-cine device according to another embodiment of the present invention.

In the above-described embodiment, the device for detecting abnormalities in the perforations according to the present invention is constituted by a single sensor 30 provided after the optical sound unit 5 but before the film drive 8 in the film running system of the tele-cine device. It is also possible to provide multiple sensors 30a, 30b both arranged after the optical sound unit 5 but before the film drive 8, and such a system is shown in FIG. 10. In the device for detecting abnormalities in motion picture film perforations shown in FIG. 10, the sensor 30a radiates an illuminating light from the surface light-emitting unit 31a via a diffusion plate 32a to the motion picture film 2 continuously fed through the optical sound unit 5 to the film drive 8 and causes the light transmitted through the motion picture film 2 to fall on a video camera 34a having a CCD image detector (not shown). The surface light-emitting unit 31a is configured for stroboscopically emitting the light by being driven by a stroboscopic power source 36a triggered by a timing signal from the control unit 35.

The sensor 30b is similarly configured for radiating an illuminating light from a surface light-emitting unit 31b via a diffusion plate 32b to the motion picture film 2 continuously fed through the optical sound unit 5 to the film drive 8 and causes the light transmitted through the motion picture film 2 to fall on a video camera 34b. The surface light-emitting unit 31b is configured for stroboscopically emitting the light by being driven by a stroboscopic power source 36b triggered by a timing signal from the control unit 35.

The video cameras 34a, 34b operate as image entering means for detecting abnormalities in the perforations by image processing and each comprises a CCD image sensor (not shown) for imaging perforations P of the motion picture film 2 at different positions within the field of view, as shown in FIG. 6.

Figure 11:
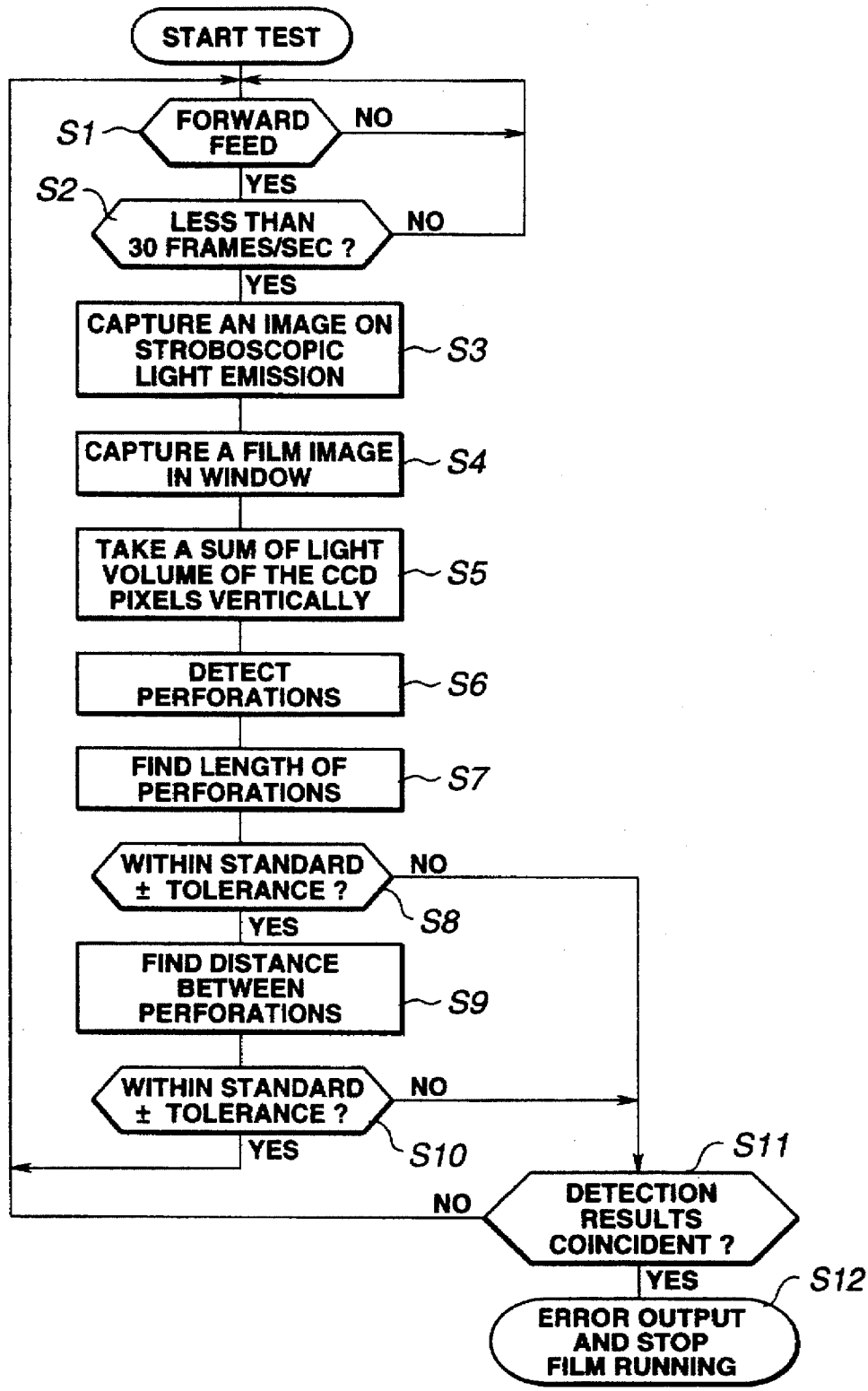
FIG. 11 is a flow chart for illustrating the operation of the controller in the device for detecting abnormalities in film perforations shown in FIG. 10.

In the present device for detecting abnormalities in motion picture film perforations, the control unit 35 is responsive to command signals from the system controller 40 to control the operation of the inspection mode as shown in the flow chart of FIG. 11. The system controller 40 accepts an operating input from the actuator 13 to control the operation of the tele-cine device 1.

When entering into the inspection mode, the control unit 35 judges at step S1 whether the motion picture film in the film running system is in the forward running state. If the result of judgment at step S1 is NO, that is, if the motion picture film is not in the forward running state, the judgment operation of step S1 is repeated to await the establishment of the forward running state. If the result of judgment is YES, that is, if the film is in the forward running state, the control unit 35 transfers to the next step S2.

The control unit 35 judges at step S2 whether the running speed of the motion picture film 2 in the film running system is lower than 30 frames/second. If the result of judgment at step S2 is NO, that is, if the running speed is higher than 30 frames/second such as in a fast forward state, the control unit 35 reverts to step S1 to repeat the judgment of steps S1 and S2 in order to await the establishment of the state of the running speed lower than 30 frames/second. If the result of the judgement is YES, that is, if the film is in the forward running state at a rate not higher than 30 frames/second, the control unit 35 transfers to the next step S3. In other words, the control unit 35 transfers to step S3 when the film drive 8 is actuated for intermittently feeding the motion picture film 2 in the forward direction at a rate not higher than 30 frames/second.

At step S3 the control unit 35 supplies a timing signal having a 33 ms period to each of the stroboscopic power sources 36a, 36b for stroboscopically emitting light from the surface light emitting units 31a, 31b. The motion picture film 2 is thereby stroboscopically imaged by the video cameras 34a, 34b.

At the next step S4, the controller 35 captures picture data of respective perforations P of an imaged picture with a field of 52×39 mm, corresponding to the film shown in FIG. 6, obtained by stroboscopically imaging the motion picture film 2 using the video cameras 34a, 34b as detection data in the widow detection areas WD.

In step S5 the controller 35 takes the sum of picture data of the detection data in the window detection area WD captured at step S4, that is, picture data of the perforation P in the vertical direction, which is the sum of the imaged picture of the field of view shown in FIG. 6 along the film width V. That is, the control unit 35 finds the sum of the light volume of the respective pixels in the CCD image sensor in the film width direction.

At step S6 the control unit 35 compares the sum found at step S5 to a predetermined light volume threshold value and deems a picture data portion where the sum is larger than the threshold value as a perforation P, while deeming a picture data portion where the sum is smaller than the threshold value as being a film base.

In step S7 the control unit 35 counts the number of pixels in the picture data portion deemed to be the perforation P at step S7, in the horizontal direction, that is, in the film running direction H, in the imaged picture of the field of view shown in FIG. 6 for finding the length of each perforation P.

In step S8 the control unit 35 judges whether the lengths of the perforation P found at the step S7 are all within the range of the prescribed value±tolerance. If the result of judgment is YES, that is, if the lengths of the perforation P as found at the step S7 are all within the range of the prescribed value±tolerance, the control unit 35 judges that the perforations P are of regular shape and transfers to step S9. If the result of judgment is NO, that is, if some of the lengths of the perforation P as found at the step S7 are not within the range of the prescribed value±tolerance, the control unit 35 judges that the perforations P are partially defective, that is, of abnormal shape and transfers to step S11.

At the next step S9 the control unit 35 finds the distance between the points of the center of gravity of neighboring portions of the picture data deemed as the perforations P at step S5.

At the next step S10 the control unit 35 judges whether the distances between the perforations P found at step S9 are all within prescribed value±tolerance. If the result of judgment at step S10 is YES, that is, if the distances between the perforations P are all within the range of the prescribed value±tolerance, the control unit 35 judges that the perforations P are regular and reverts to step S1. If the result of judgment at step S10 is NO, that is, if the distances between the perforations P are not within the range of the prescribed value±tolerance, the control unit 35 judges that the perforations P are irregular due, for example, to manual splicing during editing, and transfers to step S11.

If there is any variation in the running speed of the motion picture film 2 as it proceeds along the film running path, that is, if the film runs in an irregular manner, there is produced an apparent change in the shape of the perforations or in the distance between neighboring perforations in the image produced upon imaging the perforations P of the motion picture film 2 by the video cameras 34a, 34b at different positions along the film running path. That is, the two detected imager will not be consistent.

Thus, the control unit 35 judges at step S11 whether the results of detection of abnormalities in the perforations in the picture of the motion picture film 2 imaged by the video camera 34a and the results of detection of abnormalities in the perforations in the picture of the motion picture film 2 imaged by the video camera 34a are coincident with each other. If the result of determination at step S11 is NO, that is, if the results of detection of the abnormalities in the perforations are not coincident, the control unit 35 judges that an error has been caused in the results of detection at steps S8 or S10 due to irregular running of the motion picture film 2 and reverts to step S1. If the result of judgment is YES, that is, if the result of detection of the abnormalities are coincident, the control unit 35 judges that the perforations P are abnormal and proceeds to step S12.

At step S12, the controller 35 sends an error output indicating the abnormalities in the perforations to the system controller 40 to stop the running or intermittent feed of the motion picture film in the film running system, while turning off the imaging light source in view of this halting of the projector operation.

With the tele-cine device described above, the control unit 35 processes picture data for the perforations of the motion picture film 2 produced upon imaging the perforations of the running motion picture film 2 by the video cameras 34a, 34b of the sensors 30a, 30b provided in the film running path in order to detect abnormalities in the shape of the perforations or in the distance between neighboring perforations and judges whether the results of detection of the abnormalities in the perforations from the images produced by the video cameras 34a, 34b are coincident with each other. Thus, it can prevent mistaken detection caused by irregular running of the motion picture film 2 for correctly detecting abnormalities in the perforations in the motion picture film 2 running along the film running path.

Upon detecting such abnormalities in the motion picture film 2 running along the film running path, the control unit 35 issues an error output specifying these abnormalities in the perforations to the system controller 40 to halt the running or intermittent feed of the motion picture film in the film running system, thereby preventing occurrence of running troubles in the motion picture film otherwise caused by abnormalities in the perforations. Because the projector operation is stopped, it is possible to prevent unusual heating and consequent destruction of the motion picture film 2 by the imaging light source 7, even if the running or intermittent feed of the motion picture film through the film running system is stopped.

With the motion picture film feed device of the present invention described above, since the abnormalities in the perforations may be detected by detection means provided between the film supply reel and the intermittent film feed means in the film running system, the abnormalities in the perforations may be detected prior to intermittent feed of the motion picture film via the defective perforations.

In the motion picture film feed device according to the present invention, since film feed is stopped by stop control means responsive to detection of abnormalities in the perforations, it is possible to prevent the occurrence of running troubles of the motion picture film that would otherwise be caused by these abnormalities. In addition, since the projector operation is stopped, it is possible to prevent unusual heating and consequent destruction of the motion picture film 2, by the light unit, even if the running or intermittent feed of the motion picture film through the film running system is halted.

In addition, with the feed device for the motion picture film according to the present invention, since the perforations in the running motion picture film are imaged by the detection means for detecting abnormalities, and abnormalities in the shape and/or the distance of the perforations are detected by image processing, it becomes possible to correctly detect abnormalities in the perforations in the motion picture film running in the film running path.

With the device for detecting abnormalities in the perforations in the motion picture film according to the present invention, the perforations in the motion picture film running in the film running path are imaged by imaging means, and abnormalities in the perforations are detected by image processing by image processing means based on the imaged output, it becomes possible to correctly detect abnormalities in the perforations in the motion picture film running in the film running path.

Although the present invention has been described hereinabove with reference to the preferred embodiment, it is to be understood that the invention is not limited to such illustrative embodiment alone, and various modifications may be contrived without departing from the spirit or essential characteristics thereof, which are to be determined solely from the appended claims.

What is claimed is:

1. An apparatus for feeding a motion picture film, comprising:

film running means having a film running path for continuously reeling out a motion picture film from a film supply reel and for winding the motion picture film on a film take-up reel;

intermittent feed means arranged along said film running path for intermittently feeding the motion picture film using perforations formed in the motion picture film;

detection means arranged along said film running path between said film supply reel and said intermittent feed means for detecting abnormalities in said perforations formed in the motion picture film and for producing an error output signal indicating the presence of the abnormalities and including sensor means arranged along said film running path, video camera means for imaging a portion of the running motion picture film in response to a signal from said sensor means, and image control means supplied with an imaging picture output corresponding to the portion of the film imaged by said video camera means for detecting the abnormalities in the perforations based on said picture output; and stop control means for stopping film feed by said film running means and said intermittent feed means in response to said error output signal supplied thereto from said detection means.

2. The apparatus according to claim 1, wherein said image control means detects the abnormalities in the shape of the perforation.

3. The apparatus according to claim 1, wherein said image control means detects the abnormalities in the distance between successive perforations.

4. The apparatus according to claim 1, wherein said image control means detects the abnormalities in the distance across the width of the motion picture film for successive pairs of the perforations.

5. The apparatus according to claim 1, wherein said sensor means further includes light emitting means for radiating a light beam through the motion picture film to said video camera means for detecting a light volume corresponding to the perforations in said picture output, and wherein said image control means discriminates between the perforation and a film base of the motion picture film in response to the light volume so as to detect one of the abnormalities in the distance between the perforations and the abnormalities in the shape of said perforations.

6. The apparatus according to claim 5, wherein said stop control means terminates the radiating operation of said light emitting means in response to said error output signal.

7. The apparatus according to claim 1, wherein said video camera means includes a first video camera and a second video camera for imaging the perforations at different respective positions along the motion picture film and each for supplying an imaging picture output to said image control means, wherein said image control means detects whether both the abnormalities detected by said first and second video cameras are coincident with each other so as to judge whether an irregular running condition of the motion picture film caused the detection of the abnormalities in the perforations.

8. A device for detecting abnormalities in a motion picture film, comprising:

imaging means for imaging perforations formed in a motion picture film and for producing imaging output data corresponding to a portion of the perforations; and image processing means supplied with said imaging output for detecting by image processing abnormalities in the perforations based upon said imaging data, wherein said imaging means includes a video camera with a CCD image sensor for detecting an image corresponding to light passing through the perforations, and wherein said image processing means discriminates between the perforations and a film base of the motion picture film is response to the image of the perforations in said imaging output so as to detect the abnormalities.

9. The device according to claim 8, wherein said image processing means detects the abnormalities in the shape of the perforations.

10. The device according to claim 8, wherein said image processing means detects the abnormalities in the distance between successive perforations.

11. The device according to claim 8, wherein said image processing means detects the abnormalities in the distance across the width of the motion picture film for successive pairs of the perforations.

12. A method of controlling a motion picture apparatus reproducing a motion picture film having perforations, comprising the steps of:

running a motion picture film along a film running path;

determining whether the motion picture film is running at a rate less than thirty frames per second;

if so, capturing an image from the motion picture film using stroboscopic light emission;

detecting the perforations by taking a sum of the light volume of the captured image along the width of the motion picture film;

determining a length of the detected perforation in a motion picture film running direction;

determining whether the determined length of the detected perforation is within a predetermined length standard plus or minus a tolerance; and if not within the predetermined length standard plus or minus the tolerance stopping the running of the motion picture film.

13. The method according to claim 12 further comprising the steps of:

if within the predetermined length standard plus or minus the tolerance, determining a distance between successive perforations along the length of the motion picture film;

determining whether the determined distance is within a predetermined distance standard plus or minus a tolerance; and if not within the predetermined length standard plus or minus the tolerance stopping the running of the motion picture film.

14. The method to claim 13, wherein reproducing the motion picture film includes illuminating the running motion picture film and further comprising the step of stopping the illuminating upon stopping the running of the motion picture film.

15. A method of controlling a motion picture apparatus reproducing a motion picture film having perforations, comprising the steps of:

running a motion picture film along a film running path;

checking whether the motion picture film is running at a rate less than thirty frees per second;

if so, capturing two images from the motion picture film at spread apart locations using stroboscopic light emissions;

detecting the perforations by taking a sum of the light volumes along the width of the motion picture film of each of the two captured images;

finding respective lengths of the two detected perforations in a motion picture film running direction;

determining whether the found lengths of the detected perforations are within a predetermined length standard plus or minus a tolerance;

if not, determining whether the found lengths are coincident; and if coincidence is found, stopping the running of the motion picture film.

16. The method according to claim 15 further comprising the steps of:

if within the predetermined length standard plus or minus a tolerance, determining respective distances between each of the detected perforations and a corresponding perforation located across the width of the motion picture film;

determining whether the determined distances are within a predetermined distance standard plus or minus a tolerance;

if not, determining whether the determined distances are coincident; and if coincidence is found, stopping the running of the motion picture film.

17. The method according to claim 16, wherein reproducing the motion picture film includes illuminating the running motion picture film and further comprising the step of stopping the illuminating upon stopping the running of the motion picture film.

* * * * *

UNITED STATES PATENT AND TRADEMARK OFFICE
CERTIFICATE OF CORRECTION

PATENT NO. : 5,673,098
DATED : September 30, 1997
INVENTOR(S) : Akio Sakashita & Noriaki Sakata It is certified that error appears in the above-identified patent and that said Letters Patent is hereby corrected as shown below:

On the title page, item [75] Inventors, change "Kanagawa" to -- Tokyo --.
Col.4, line 66, change "Con-" to --con- --
Col. 7, line 34, change "value±tolerance" to --value ± tolerance--
      line 36, change "value±tolerance" to --value ± tolerance--
      line 42, change "value±tolerance" to --value ± tolerance--
      line 56, change "values±tolerance" to --values ± tolerance--
      line 59, change "value±tolerance" to -- value ± tolerance--
      line 63, change "value±tolerance" to --value ± tolerance--
Col.8, line 2, change "value±tolerance" to --value ± tolerance--
Col.9, line 65, change "value±tolerance" to --value ± tolerance--
Col.10, line 1, chage "value±tolerance" to -- value ± tolerance--
      line 5, change "value±tolerance" to --value ± tolerance--
      line 15, change "value±tolerance" to --values ± tolerance--
      line 18, change "value±tolerance" to --value ± tolerance--
      line 22, change "value±tolerance" to --value ± tolerance--

In the claims:
    Col.14, line 6, change "frees" to --frames--

Signed and Sealed this

Eighth Day of September, 1998

Attest:

BRUCE LEHMAN

*Attesting Officer*      *Commissioner of Patents and Trademarks*